UNITED STATES PATENT OFFICE.

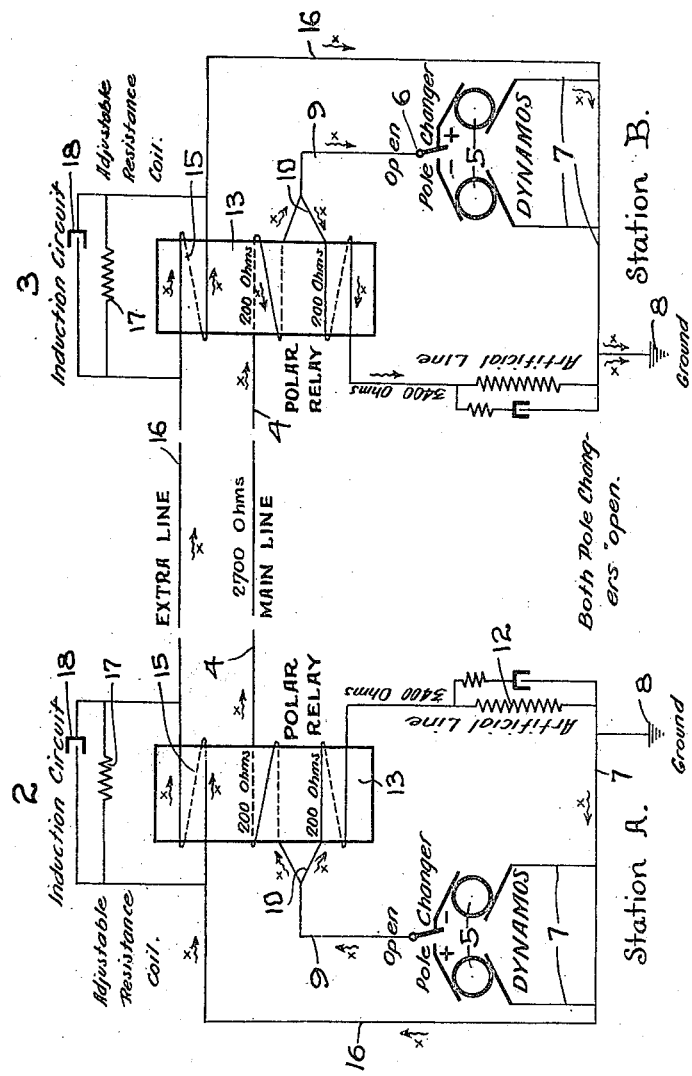

TOM P. MASTERS, OF VANCOUVER, BRITISH COLUMBIA, CANADA.

MEANS FOR NEUTRALIZING THE EFFECT OF EARTH CURRENTS IN A POLAR RELAY.

1,402,240.  Specification of Letters Patent.  Patented Jan. 3, 1922.

Application filed September 24, 1919. Serial No. 325,920.

*To all whom it may concern:*

Be it known that I, TOM P. MASTERS, a citizen of the Dominion of Canada, residing at Vancouver, in the Province of British Columbia, Canada, have invented certain new and useful Improvements in Means for Neutralizing the Effect of Earth Currents in a Polar Relay, of which the following is a specification.

This invention relates to a means for neutralizing in a polar relay, such as is used in duplex telegraph working, the effect of aurora or earth currents in the relay instruments. These earth currents at various times seriously obstruct the operation of polar relay instruments.

The means by which I neutralize these earth currents is fully set forth in the following specification, reference being made to the diagram, which accompanies and forms a part of this application.

In this diagram 2 and 3 represent two stations connected by a main line 4. The instruments and connections at each station being the same are represented by the same reference letters.

The battery dynamos of each station are represented by 5 and the pole changer of each by 6. The dynamos are connected to earth at 8 by the lines 7, and the line 9 from the pole changer of the dynamos divides at 10 and the branches pass in opposite directions around the coils of the polar relay 13, one branch being thereafter connected by the main line 4 to the other station, and the other branch through a resistance 12 equivalent to that of the line 4, to the earth at 8.

The description so far is of the customary telegraph polar relay circuit. With it, if there is a difference of potential in earth currents at the two places, which causes a flow of current from the station 2 to the station 3, as indicated by the arrows X, that current flows from the earth at 8 through the dynamo circuit 9 and the main line coil of the polar relay, and also through the artificial line 12 and through both the artificial and main line coils of the relay, thus controlling the relay and rendering it unusable.

The current then passes along the main line 4 to the other station 3 and through the main line coil of the relay at that station and divides at 10 a portion passing through the artificial line coil of the relay to earth and a portion through the dynamo circuit to earth. The relay instruments of both stations are thus controlled by the earth currents and are unusable if the earth currents are of sufficient strength.

It is to counterbalance and neutralize this disturbing influence on an earth current that the invention, which is the subject of this application, has been devised. This is attained by providing an extra line 16 between the two stations 2 and 3 and by connecting this line to earth at both stations through an oppositely connected neutralizing coil 15 in each polar relay 13.

Across between the terminals of the neutralizing relay coil 15 an adjustable resistance 17 is introduced, by which the amount of current flowing through each coil 15 may be regulated to equalize it to the earth current flowing through the working coils. I also insert a condenser 18 between the same terminals of each neutralizing coil to provide a path for induced currents from other wires.

With these provisions the same earth current X, which disarranged both polar relays, is used to neutralize its disarranging effect, the adjustable resistance 17 providing a means for varying the amount of current which passes through the coil 15 to what is required to balance the effect of the earth current through the operating coils.

This arrangement of the neutralizing coil, with adjustable resistance across its terminals, is equally applicable to the polar relay in direct winding or the bridge working.

Although described and illustrated in its application to a single instrument at each station, the same supplementary line 16 and its earth connections may be applied to all the instruments of the station requiring such.

Balancing of the earth currents will obviously be done when the pole changers 6 at both stations are open and no battery current is in the line and when consequently the earth currents are in entire control, the earth currents may then be balanced by varying the adjustable resistance 17.

While the resistance of the duplex circuit, with both pole changers open, will vary when both pole changers are closed, or when one only is closed, the working margin of the dynamo current will be sufficient to control the polar relay. The dynamo current would naturally have to be increased if the earth currents become excessive. A dynamo potential of two hundred (200) volts would control earth current voltage up to nearly four hundred (400) volts.

Having now particularly described my invention, I hereby declare that what I claim as new and desire to be protected in by Letters Patent, is:

1. In a telegraph polar relay, an earth current neutralizing coil supplementary to and oppositely connected to the working coils of the relay, one end of which supplementary coil is connected to the earth adjacent the relay and the other end to earth at a distant station through a line separate from the main operating line of the relay and an induction circuit and adjustable resistance connected in shunt with the neutralizing coils.

2. In a telegraph polar relay, an earth current neutralizing coil supplementary to and oppositely connected to the working coils of the relay, one end of which supplementary coil is connected to the earth adjacent the relay and the other end to earth at a distant station through a line separate from the main operating line of the relay, and means for varying the amount of current passing through the earth current neutralizing coil and resistance placed in shunt with the extra line.

3. In a telegraph polar relay, an earth current neutralizing coil supplementary to and oppositely connected to the working coils of the relay, one end of which supplementary coil is connected to the earth adjacent the relay and the other end to earth at a distant station through a line separate from the main operating line of the relay, and means for varying the amount of current passing through the earth current neutralizing coil, said means comprising a variable resistance in shunt with relation to the neutralizing coil.

4. In a telegraph polar relay circuit, means for neutralizing the earth currents, said means comprising the combination with the polar relay instruments at two separate stations, of a neutralizing coil on each relay instrument, one end of each of which coils is connected to earth at its own station and the other end connected to the other end of the coil at the other station through an extra line, and means for varying the amount of current allowed to pass through each earth current neutralizing coil to what is required to balance the disarranging effect of the earth current in the operating coil of the polar relay.

5. In a telegraph polar relay circuit wherein is provided dynamos, pole changers and polar relays one at each station and a main line wire connecting the two stations, an artificial circuit at each station, said artificial circuit and the main line circuit including opposing coils in the respective polar relays; means for neutralizing the earth current, said means comprising the combination with the polar relays at the two separate stations, of a neutralizing coil on each relay instrument, one end of each of which coils is grounded at its own station and the other end connected to the other end of the coil of the other station through an extra line, and a shunt circuit around each neutralizing coil, said shunt circuit including an adjustable resistance.

6. In a telegraph polar relay, an earth current neutralizing coil supplementary to and oppositely connected to the working coils of the relay, one end of which supplementary coil is connected to the earth adjacent to the relay and the other end is connected to the earth at a distant station through a line separate from the main operating line of the relay and a shunt around said neutralizing coil provided with means for varying the amount of current passing through said neutralizing coil.

In testimony whereof I affix my signature.

TOM P. MASTERS.